US011191051B2

(12) United States Patent
Abedini et al.

(10) Patent No.: US 11,191,051 B2
(45) Date of Patent: *Nov. 30, 2021

(54) DETERMINING A REFERENCE TIMING FOR A DISCOVERY PROCEDURE

(71) Applicant: QUALCOMM Incorporated, San Diego, CA (US)

(72) Inventors: Navid Abedini, Somerset, NJ (US); Zhibin Wu, Los Altos, CA (US); Junyi Li, Chester, NJ (US); Sudhir Kumar Baghel, Hillsborough, NJ (US); Kapil Gulati, Hillsborough, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/947,611

(22) Filed: Aug. 10, 2020

(65) Prior Publication Data

US 2020/0374825 A1    Nov. 26, 2020

Related U.S. Application Data

(63) Continuation of application No. 16/272,635, filed on Feb. 11, 2019, now Pat. No. 10,757,668.

(Continued)

(51) Int. Cl.
*H04W 56/00* (2009.01)
*H04W 8/00* (2009.01)
(Continued)

(52) U.S. Cl.
CPC ....... *H04W 56/0045* (2013.01); *H04J 3/0638* (2013.01); *H04W 8/005* (2013.01);
(Continued)

(58) Field of Classification Search
CPC combination set(s) only.
See application file for complete search history.

(56) References Cited

U.S. PATENT DOCUMENTS 5,898,902 A * 4/1999 Tuzov ................. H04B 7/2125
455/13.1
6,804,527 B2  10/2004 Struhsaker et al.
(Continued)

FOREIGN PATENT DOCUMENTS

EP       2928257 A1     10/2015

OTHER PUBLICATIONS

Nogués-Correig, Oleguer, et al. "A GPS-reflections receiver that computes Doppler/delay maps in real time." IEEE Transactions on Geoscience and Remote sensing 45.1 (2006): 156-174. (Year: 2006).*

(Continued)

*Primary Examiner* — Sharad Rampuria

(74) *Attorney, Agent, or Firm* — Harrity & Harrity, LLP

(57) ABSTRACT

Various aspects of the present disclosure generally relate to wireless communication. In some aspects, a client device may receive a discovery signal from a host device; determine whether to use a receive timing from the host device, an internal timing of the client device, or a combination of the receive timing and the internal timing to configure a reference timing; configure the reference timing, for transmission of a response to the discovery signal, using the receive timing from the host device, the internal timing of
(Continued)

the client device, or the combination of the receive timing and the internal timing based at least in part on the determination of whether to use the receive timing, the internal timing, or the combination of the receive timing and the internal timing; and transmit the response to the host device using the configured reference timing. Numerous other aspects are provided.

30 Claims, 9 Drawing Sheets

Related U.S. Application Data

(60) Provisional application No. 62/635,991, filed on Feb. 27, 2018.

(51) Int. Cl.
*H04J 3/06* (2006.01)
*H04W 74/08* (2009.01)
*H04W 76/14* (2018.01)
*H04W 48/16* (2009.01)

(52) U.S. Cl.
CPC ..... *H04W 56/001* (2013.01); *H04W 56/0015* (2013.01); *H04W 74/0833* (2013.01); *H04W 48/16* (2013.01); *H04W 56/006* (2013.01); *H04W 76/14* (2018.02)

(56) References Cited

U.S. PATENT DOCUMENTS

| | | | |
|---|---|---|---|
| 10,038,547 | B2 | 7/2018 | Lecourtier |
| 10,165,535 | B2 * | 12/2018 | Sorrentino .......... H04W 56/002 |
| 10,757,668 | B2 | 8/2020 | Abedini et al. |
| 2006/0281476 | A1 | 12/2006 | Lane et al. |
| 2014/0226639 | A1 | 8/2014 | Yi et al. |
| 2015/0341876 | A1 | 11/2015 | Abraham et al. |
| 2016/0057718 | A1 * | 2/2016 | Sorrentino ........ H04W 72/0446 370/350 |
| 2016/0135178 | A1 | 5/2016 | Mok et al. |

OTHER PUBLICATIONS

International Search Report and Written Opinion—PCT/US2019/017704—ISA/EPO—dated May 15, 2019.

* cited by examiner ns is a continuation of U.S. patent application Ser. No. 16/272,635, filed on Feb. 11, 2019 (now U.S. Pat. No. 10,757,668), entitled "DETERMINING A REFERENCE TIMING FOR A DISCOVERY PROCEDURE," which claims priority to U.S. Provisional Patent Application No. 62/635,991, filed on Feb. 27, 2018, entitled "TECHNIQUES AND APPARATUSES FOR DETERMINING A REFERENCE TIMING FOR A DISCOVERY PROCEDURE," which are hereby expressly incorporated by reference herein.

DETERMINING A REFERENCE TIMING FOR A DISCOVERY PROCEDURE

CROSS-REFERENCE TO RELATED APPLICATIONS UNDER 35 U.S.C. § 119

This application is a continuation of U.S. patent application Ser. No. 16/272,635, filed on Feb. 11, 2019 (now U.S. Pat. No. 10,757,668), entitled "DETERMINING A REFERENCE TIMING FOR A DISCOVERY PROCEDURE," which claims priority to U.S. Provisional Patent Application No. 62/635,991, filed on Feb. 27, 2018, entitled "TECHNIQUES AND APPARATUSES FOR DETERMINING A REFERENCE TIMING FOR A DISCOVERY PROCEDURE," which are hereby expressly incorporated by reference herein.

FIELD OF THE DISCLOSURE

Aspects of the present disclosure generally relate to wireless communication, and more particularly to techniques and apparatuses for determining a reference timing for a discovery procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a client device, may include receiving, from a host device, a discovery signal; determining whether to use a receive timing from the host device, an internal timing of the client device, or a combination of the receive timing and the internal timing to configure a reference timing; configuring the reference timing, for transmission of a response to the discovery signal, using the receive timing from the host device, the internal timing of the client device, or the combination of the receive timing and the internal timing based at least in part on the determination of whether to use the receive timing, the internal timing, or the combination of the receive timing and the internal timing; and transmitting the response to the host device using the configured reference timing.

In some aspects, a client device for wireless communication may include memory and one or more processors operatively coupled to the memory. The memory and the one or more processors may be configured to receive, from a host device, a discovery signal; determine whether to use a receive timing from the host device, an internal timing of the client device, or a combination of the receive timing and the internal timing to configure a reference timing; configure the reference timing, for transmission of a response to the discovery signal, using the receive timing from the host device, the internal timing of the client device, or the combination of the receive timing and the internal timing based at least in part on the determination of whether to use the receive timing, the internal timing, or the combination of the receive timing and the internal timing; and transmit the response to the host device using the configured reference timing.

In some aspects, a non-transitory computer-readable medium may store one or more instructions for wireless communication. The one or more instructions, when executed by one or more processors of a client device, may cause the one or more processors to receive, from a host device, a discovery signal; determine whether to use a receive timing from the host device, an internal timing of the client device, or a combination of the receive timing and the internal timing to configure a reference timing; configure the reference timing, for transmission of a response to the discovery signal, using the receive timing from the host device, the internal timing of the client device, or the combination of the receive timing and the internal timing based at least in part on the determination of whether to use the receive timing, the internal timing, or the combination of the receive timing and the internal timing; and transmit the response to the host device using the configured reference timing.

In some aspects, a client apparatus for wireless communication may include means for receiving, from a host apparatus, a discovery signal; means for determining whether to use a receive timing from the host apparatus, an internal timing of the client apparatus, or a combination of the receive timing and the internal timing to configure a reference timing; means for configuring the reference timing, for transmission of a response to the discovery signal, using the receive timing from the host apparatus, the internal timing of the client apparatus, or the combination of the receive timing and the internal timing based at least in part on the determination of whether to use the receive timing, the internal timing, or the combination of the receive timing and the internal timing; and means for transmitting the response to the host apparatus using the configured reference timing.

In some aspects, a method of wireless communication, performed by a host device, may include determining whether to use a receive timing from the host device, an internal timing of a client device that receives a discovery signal from the host device, or a combination of the receive timing and the internal timing as a reference timing to be used to monitor for a response to the discovery signal; determining the reference timing to be used to monitor for the response to the discovery signal based at least in part on the determination of whether to use the receive timing, the internal timing of the client device that receives the discovery signal, or the combination of the receive timing and the internal timing; transmitting the discovery signal; and monitoring a set of resources for the response based at least in part on the reference timing.

In some aspects, a host device for wireless communication may include memory and one or more processors operatively coupled to the memory. The memory and the one or more processors may be configured to determine whether to use a receive timing from the host device, an internal timing of a client device that receives a discovery signal from the host device, or a combination of the receive timing and the internal timing as a reference timing to be used to monitor for a response to the discovery signal; determine the reference timing to be used to monitor for the response to the discovery signal based at least in part on the determination of whether to use the receive timing, the internal timing of the client device that receives the discovery signal, or the combination of the receive timing and the internal timing; transmit the discovery signal; and monitor a set of resources for the response based at least in part on the reference timing.

In some aspects, a non-transitory computer-readable medium may store one or more instructions for wireless communication. The one or more instructions, when executed by one or more processors of a host device, may cause the one or more processors to determine whether to use a receive timing from the host device, an internal timing of a client device that receives a discovery signal from the host device, or a combination of the receive timing and the internal timing as a reference timing to be used to monitor for a response to the discovery signal; determine the reference timing to be used to monitor for the response to the discovery signal based at least in part on the determination of whether to use the receive timing, the internal timing of the client device that receives the discovery signal, or the combination of the receive timing and the internal timing; transmit the discovery signal; and monitor a set of resources for the response based at least in part on the reference timing.

In some aspects, a host apparatus for wireless communication may include means for determining whether to use a receive timing from the host apparatus, an internal timing of a client apparatus that receives a discovery signal from the host apparatus, or a combination of the receive timing and the internal timing as a reference timing to be used to monitor for a response to the discovery signal; means for determining the reference timing to be used to monitor for the response to the discovery signal based at least in part on the determination of whether to use the receive timing, the internal timing of the client apparatus that receives the discovery signal, or the combination of the receive timing and the internal timing; means for transmitting the discovery signal; and means for monitoring a set of resources for the response based at least in part on the reference timing.

Aspects generally include a method, apparatus, system, computer program product, non-transitory computer-readable medium, user equipment, base station, host device, client device, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It should be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
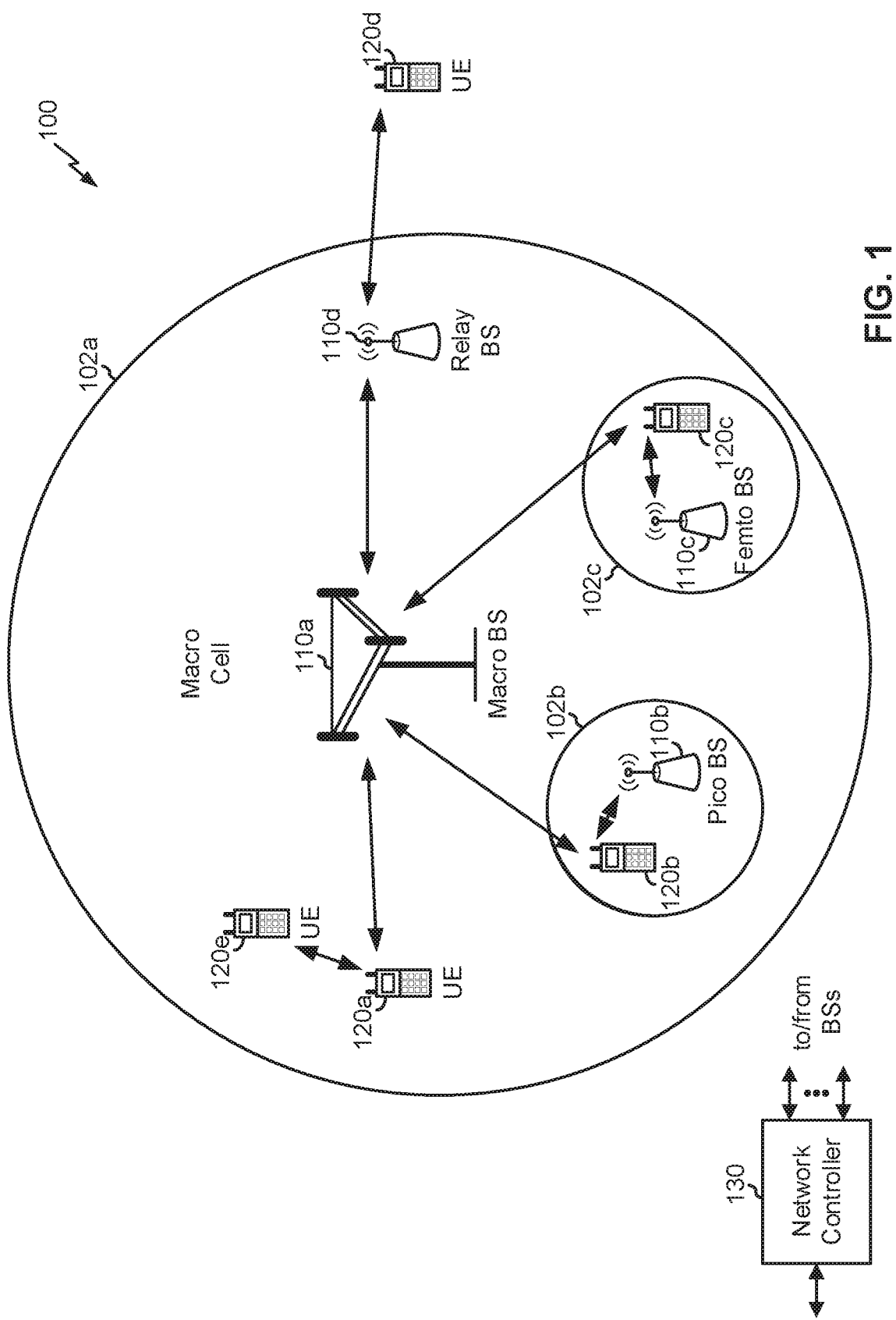
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipments (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smartjewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
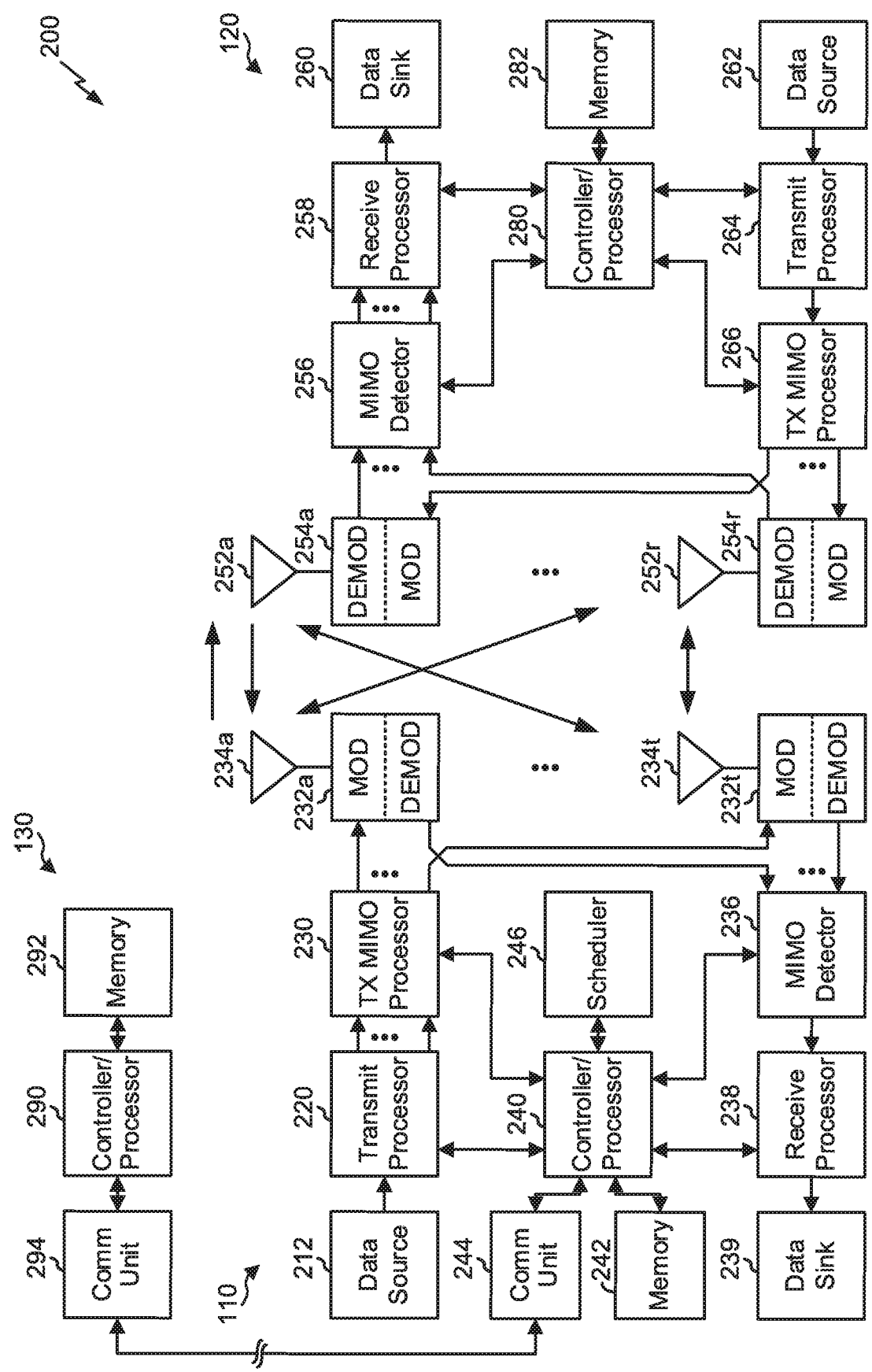
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with determining a reference timing for a discovery procedure, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 and/or base station 110 may include means for receiving, from a host device, a discovery signal; means for determining whether to use a receive timing from the host device, an internal timing of the client device, or a combination of the receive timing and the internal timing to configure a reference timing; means for configuring the reference timing, for transmission of a response to the discovery signal, using the receive timing from the host device, the internal timing of the client device, or the combination of the receive timing and the internal timing based at least in part on the determination of whether to use the receive timing, the internal timing, or the combination of the receive timing and the internal timing; means for transmitting the response to the host device using the configured reference timing; and/or the like. Additionally, or alternatively, UE 120 and/or base station 110 may include means for determining whether to use a receive timing from the host device, an internal timing of a client device that receives a discovery signal from the host device, or a combination of the receive timing and the internal timing as a reference timing to be used to monitor for a response to the discovery signal; means for determining the reference timing to be used to monitor for the response to the discovery signal based at least in part on the determination of whether to use the receive timing, the internal timing of the client device that receives the discovery signal, or the combination of the receive timing and the internal timing; means for transmitting the discovery signal; means for monitoring a set of resources for the response based at least in part on the reference timing; and/or the like. In some aspects, such means may include one or more components of UE 120 and/or base station 110 described in connection with FIG. 2.

As indicated above, FIG. 2 is provided as an example. Other examples may differ from what is described with regard to FIG. 2. For example, while FIG. 2 shows a base station 110 and a UE 120 communicating with one another, in some aspects, two base stations 110 may communicate with one another, or two UEs 120 may communicate with one another.

Figure 3:
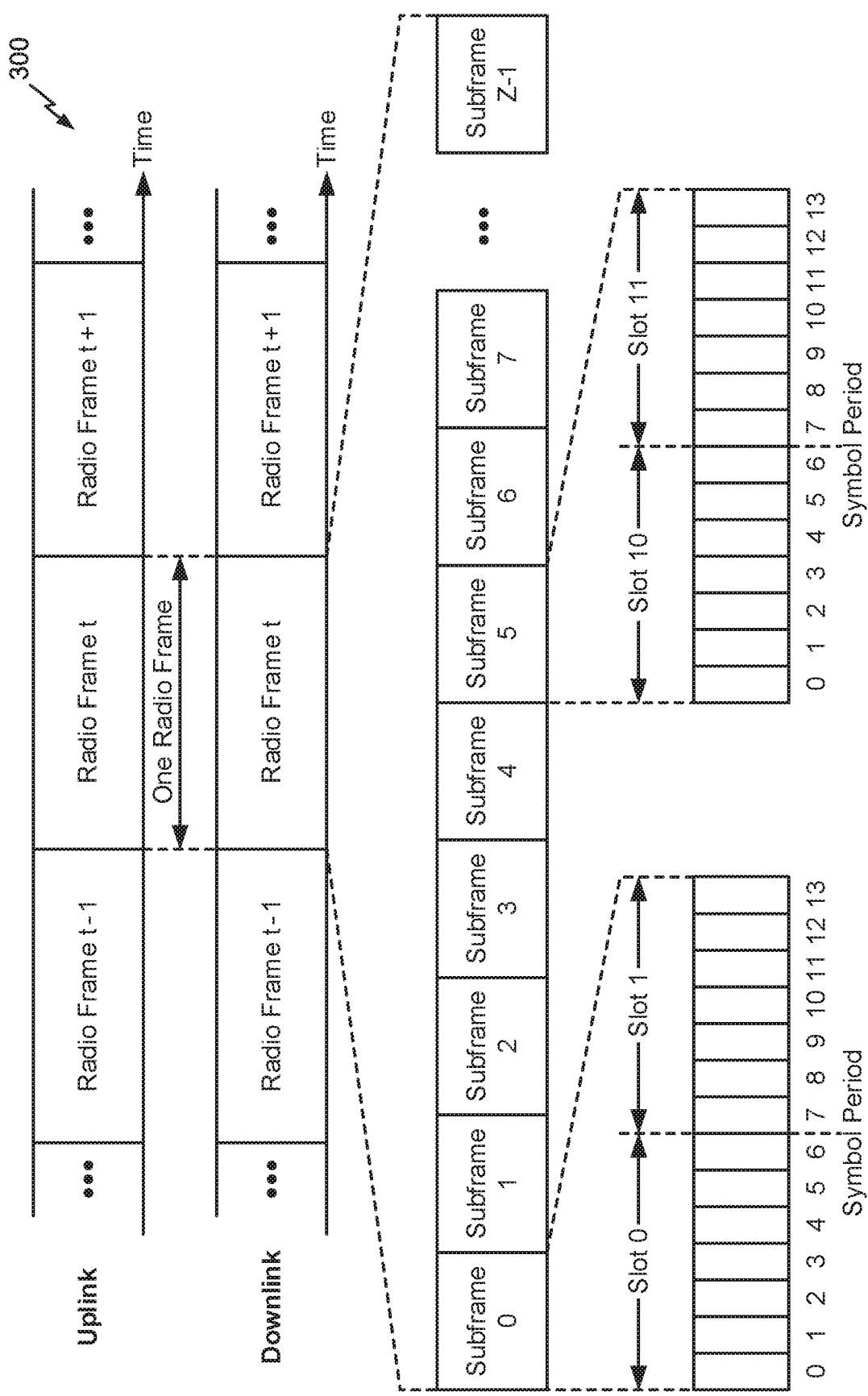
FIG. 3 is a block diagram conceptually illustrating an example of a frame structure in a wireless communication network, in accordance with various aspects of the present disclosure.

FIG. 3 shows an example frame structure 300 for FDD in a telecommunications system (e.g., NR). The transmission timeline for each of the downlink and uplink may be partitioned into units of radio frames. Each radio frame may have a predetermined duration and may be partitioned into a set of Z (Z≥1) subframes (e.g., with indices of 0 through Z−1). Each subframe may include a set of slots (e.g., two slots per subframe are shown in FIG. 3). Each slot may include a set of L symbol periods. For example, each slot may include seven symbol periods (e.g., as shown in FIG. 3), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures and/or transmission time intervals, which may be referred to using terms other than "frame," "subframe," "slot," and/or the like in 5G NR. In some aspects, a wireless communication structure and/or a transmission time interval may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 3 is provided as an example. Other examples may differ from what is described with regard to FIG. 3.

Figure 4:
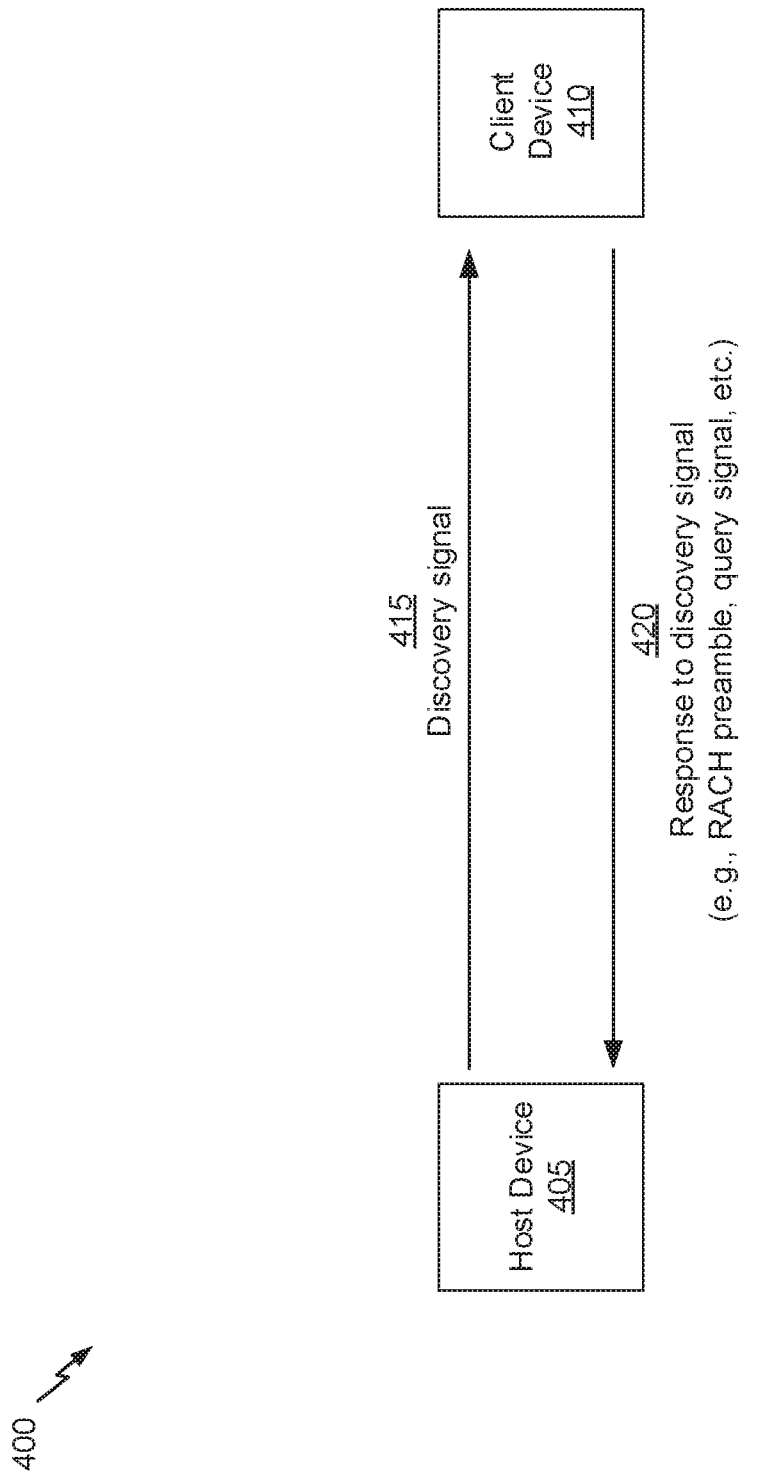
FIGS. 4-7 are diagrams illustrating examples relating to determining a reference timing for a discovery procedure, in accordance with various aspects of the present disclosure.

FIG. 4 is a diagram illustrating an example 400 relating to determining a reference timing for a discovery procedure, in accordance with various aspects of the present disclosure.

As shown in FIG. 4, a host device 405 (e.g., a base station 110, a UE 120, and/or the like) may use a discovery procedure to assist with establishing a connection with a client device 410 (e.g., a base station 110, a UE 120, and/or the like). As shown by reference number 415, as part of the discovery procedure, the host device 405 may transmit (e.g., via broadcasting, beam sweeping, and/or the like) a discovery signal. The discovery signal may include information about the host device 405, such as a device type of the host device 405 (e.g., one or more device types of base station 110 and/or UE 120, as described above in connection with FIG. 1), a type of information sought by the host device 405, a type of information offered by the host device 405, a discovery mode associated with the host device 405, and/or the like. The client device 410 may receive the discovery signal, may analyze information included in the discovery signal, and may determine whether to establish a connection with the host device 405 based at least in part on the information included in the discovery signal.

As shown by reference number 420, the client device 410 may transmit, to the host device 405, a response to the discovery signal. The response may include a request to establish a connection with the host device 405, a request for additional information associated with the host device 405, and/or the like. For example, the request may include a connection setup request associated with the discovery procedure, a random access channel (RACH) preamble associated with the discovery procedure, a RACH message associated with the discovery procedure (e.g., RACH MSG1 and/or the like), a query signal associated with the discovery procedure, and/or the like.

When transmitting the response, the client device 410 may need to determine a reference timing to be used for transmission of the response, such as a reference timing that defines a symbol timing, a frame timing, a subframe timing, a slot timing, or a timing of another type of transmission time interval (TTI) or wireless communication structure. Similarly, the host device 405 may need to determine a reference timing to be used to monitor for the response. In an access network, where a UE 120 communicates with a base station 110, such reference timing may be communicated from the base station 110 to the UE 120 using a synchronization signal, such as a PSS, an SSS, and/or the like, as described above in connection with FIG. 3. However, such synchronization signals may not be available prior to reception of the discovery signal because the discovery signal is the first signal received by the client device 410 from the host device 405. In some aspects, a discovery procedure may be used for UE-to-UE communications, BS-to-BS communications (e.g., for a wireless backhaul network), vehicle-to-everything (V2X) communications (e.g., cellular vehicle to everything (CV2X) communications), and/or the like.

In some cases, a timing source external from the host device 405 and the client device 410 may be used for synchronizing reference timings. For example, the host device 405 and the client device 410 may synchronize reference timings using a global positioning system (GPS) timing, a global navigation satellite system (GNSS) timing, a timing from a cellular network, and/or the like. However, there may be inaccuracies associated with using such an external timing source, which may lead to a failure to synchronize reference timings of the host device 405 and the client device 410.

Some techniques and apparatuses described herein assist the host device 405 and the client device 410 with determining a reference timing for a response to the discovery signal, thereby reducing communication errors associated with using different timings. As described in more detail elsewhere herein, the host device 405 and/or the client device 410 may determine the reference timing using a receive timing from the host device 405 (e.g., indicated in and/or determined based at least in part on the discovery signal), an internal timing of the client device 410 (e.g., an internal timing determined from an external timing source), or a combination of the receive timing and the internal timing.

In some aspects, the determination of the reference timing may be made to reduce a timing offset (or a range of timing offsets) of a transmission timing of the host device 405 (e.g., a symbol timing used for transmission of the discovery signal) and a reception timing of the host device 405 (e.g., a symbol timing used for reception of the response to the discovery signal). Such a reduced timing offset (or range of timing offsets) may reduce inter-symbol interference, may permit the use of a smaller cyclic prefix or smaller gaps (e.g., thereby reducing resource overhead), may permit the use of smaller cyclic shifts for different RACH preambles (e.g., thereby permitting a larger number of RACH preambles to be used to differentiate between client devices 410), and/or the like.

As indicated above, FIG. 4 is provided as an example. Other examples may differ from what is described with respect to FIG. 4.

Figure 5:
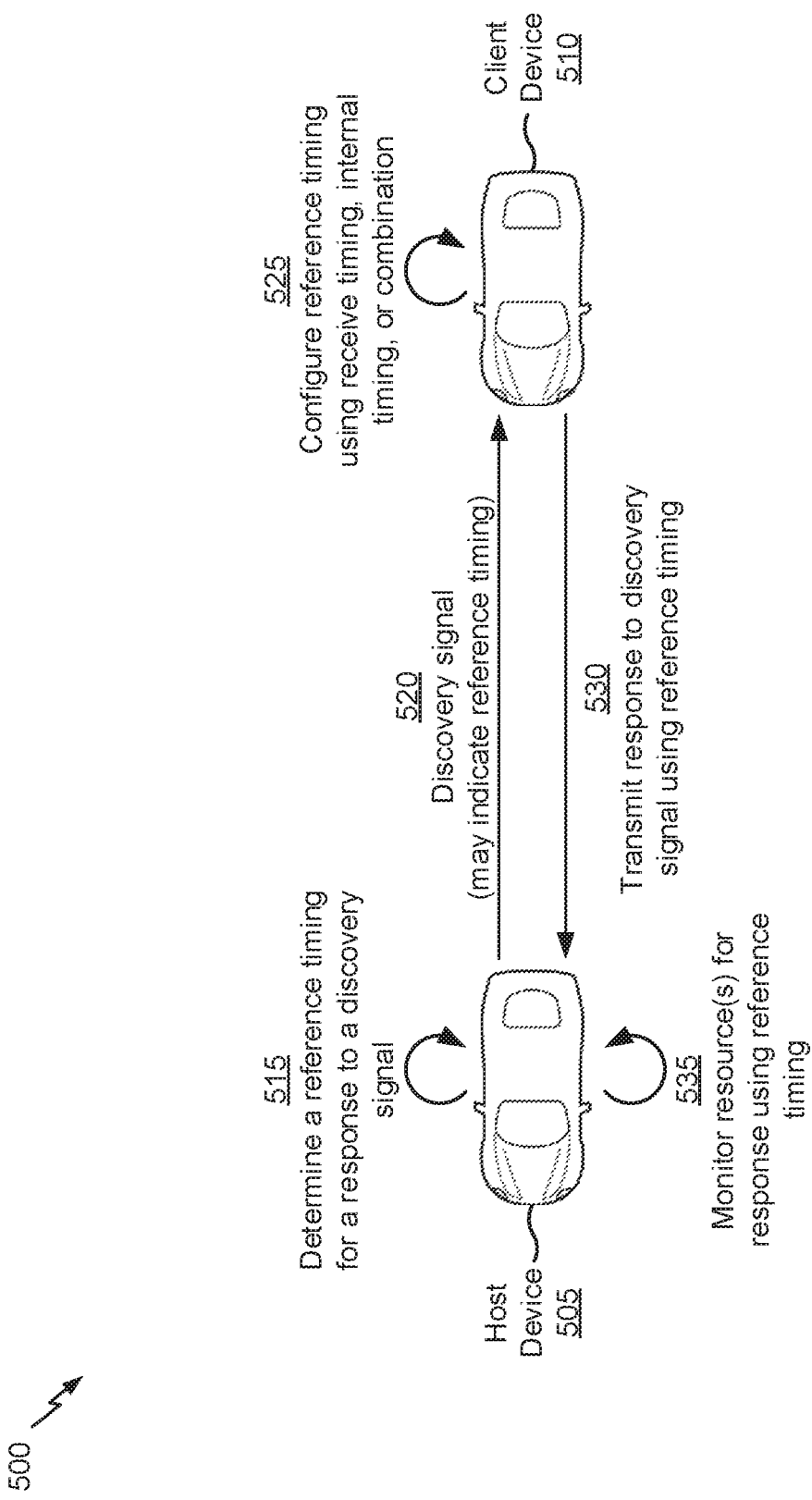

FIG. 5 is a diagram illustrating another example 500 relating to determining a reference timing for a discovery procedure, in accordance with various aspects of the present disclosure.

As shown in FIG. 5, a host device 505 and a client device 510 may use a discovery procedure to establish a connection with one another, as described above in connection with FIG. 4. In some aspects, the host device 505 may include a base station 110, a UE 120, and/or the like. In some aspects, the client device 510 may include a base station 110, a UE 120, and/or the like. For the purpose of FIG. 5, the host device 505 and the client device 510 are described as UEs 120 associated with vehicles, where the UEs 120 communicate using, for example, a UE-to-UE protocol, a V2X protocol (e.g., a CV2X protocol), and/or the like. However, in some aspects, the discovery procedure may be associated with a different type of protocol. For example, the host device 505 and the client device 510 may be base stations 110 performing a discovery procedure to establish a mesh network, a wireless backhaul network, and/or the like.

As shown by reference number 515, the host device 505 may determine a reference timing for a response to a discovery signal. The reference timing may include, for example, a symbol timing (e.g., one or more boundaries for a symbol), a slot timing, a subframe timing, a frame timing, and/or a timing associated with another type of transmission time interval (TTI) or wireless communication structure. The reference timing may be used by the client device 510 for transmission of a response to the discovery signal, and/or may be used by the host device 505 for determination of one or more resources (e.g., time resources) to be monitored for the response to the discovery signal.

In some aspects, the reference timing is determined based at least in part on a receive timing from the host device 505. The receive timing may include a timing used by the host device 505, which may be determined based at least in part on an internal timing of the host device 505. In some aspects, the internal timing of the host device 505 may be determined using an external timing source, such as a GPS timing, a GNSS timing, a cellular network timing, and/or the like. In some aspects, the host device 505 may indicate the receive timing to the client device 510, as described in more detail below.

Additionally, or alternatively, the reference timing may be determined based at least in part on an internal timing of the client device 510. In some aspects, the host device 505 may not store information that identifies the internal timing of the client device 510, but may determine information associated with a characteristic of the internal timing of the client device 510 (e.g., an accuracy of the internal timing and/or the like), and may use such information to determine the reference timing. In some aspects, the reference timing may be determined based at least in part on a combination of the receive timing and the internal timing (e.g., an average, a weighted average, a weighted combination, a maximum, a minimum, and/or the like).

In some aspects, the host device 505 may determine the reference timing based at least in part on a maximum propagation delay associated with the client device 510 or the host device 505, a worst case difference between internal timings of the client device 510 and the host device 505, and/or the like. Additional details are described below in connection with FIGS. 6 and 7.

Additionally, or alternatively, the host device 505 may determine the reference timing based at least in part on an indication from another device, such as a base station 110 and/or the like. For example, the host device 505 and/or the client device 510 may use an out-of-band connection (e.g., an indirect connection) to communicate reference timings, such as via one or more base stations 110 to which the host device 505 and/or the client device 510 are connected. Additionally, or alternatively, the host device 505 may determine the reference timing based at least in part on a default value stored in memory of the host device 505 (e.g., a pre-configured value, a value from a 3GPP specification, and/or the like).

Additionally, or alternatively, the host device 505 may determine the reference timing based at least in part on one or more dynamic parameters associated with an environment in which the host device 505 is operating. A dynamic parameter may include, for example, a speed with which the host device 505 is moving, a direction in which the host device 505 is moving, a distance between the host device 505 and one or more client devices 510, an acceleration of the host device 505, a topography of a location of the host device 505, and/or the like. One or more of these dynamic parameters may impact a maximum propagation delay and/or a worst case difference between internal timings of the client device 510 and the host device 505, which may impact whether selection of the receive timing from the host device 505, the internal timing of the client device 510, or a combination of the receive timing and the internal timing would improve performance, as described in more detail below in connection with FIGS. 6 and 7. Thus, in some aspects, the host device 505 may determine whether to use the receive timing, the internal timing, or a combination of the receive timing and the internal timing as the reference timing. For example, the host device 505 may select one of multiple options of timings to be used as the reference timing, where the multiple options include the receive timing, the internal timing, and a combination of the receive timing and the internal timing.

Additionally, or alternatively, the host device 505 may determine the reference timing based at least in part on a timing accuracy of the host device 505. A timing accuracy may represent a likelihood that an internal timing of a device is accurate with respect to an external source. The timing accuracy may depend on, for example, a location of the device (e.g., in a tunnel, in a dense urban environment, in a rural environment, and/or the like), a number of GNSS/GPS satellites to which the device is connected, an amount of time that the device has been connected to a GNSS/GPS satellite, and/or the like. The timing accuracy may impact a worst case difference between internal timings of the client device 510 and the host device 505, which may impact whether selection of the receive timing from the host device 505, the internal timing of the client device 510, or a combination of the receive timing and the internal timing would improve performance, as described in more detail below in connection with FIGS. 6 and 7.

Additionally, or alternatively, the host device 505 may determine the reference timing based at least in part on a communication schedule associated with the host device 505. For example, the host device 505 may select a reference timing that avoids interfering with one or more other communications scheduled for the host device 505.

Additionally, or alternatively, the host device 505 may determine the reference timing based at least in part on a frequency band used for communications between the client device 510 and the host device 505. For example, the internal timing may be selected for the reference timing when the client device 510 and the host device 505 communicate using a sub-6 GHz frequency band. As another example, the receive timing may be selected for the reference timing when the client device 510 and the host device 505 communicate using a millimeter wave frequency band.

As shown by reference number 520, the host device 505 may transmit, and the client device 510 may receive, the discovery signal. For example, the host device 505 may broadcast the discovery signal, may perform beam sweeping to transmit the discovery signal, and/or the like. The client device 510 may receive the discovery signal, may analyze information included in the discovery signal, and may determine whether to establish a connection with the host device 505 based at least in part on the information included in the discovery signal. In some aspects, the discovery signal is associated with a CV2X discovery procedure. In some aspects, the host device 505 may indicate the reference timing using the discovery signal (e.g., explicitly or implicitly), as described in more detail below. In this case, the host device 505 may configure the discovery signal based at least in part on the determined reference timing. For example, the discovery signal may include a RACH configuration, and the host device 505 may determine the RACH configuration to be included in the discovery signal based at least in part on the determined reference timing.

As shown by reference number 525, the client device 510 may configure a reference timing, for transmission of a response to the discovery signal, using a receive timing from the host device 505, an internal timing of the client device 510, or a combination of the receive timing and the internal timing. In some aspects, the reference timing is configured based at least in part on a receive timing from the host device 505. As described above, the receive timing may include a timing used by the host device 505, which may be determined based at least in part on an internal timing of the host device 505. In some aspects, the client device 510 may determine the receive timing based at least in part on a timing with which the discovery signal is received from the host device 505.

Additionally, or alternatively, the reference timing may be configured based at least in part on an internal timing of the client device 510. In some aspects, the internal timing of the client device 510 may be determined using an external timing source (e.g., a source external to the client device 510 other than the host device 505), such as a GPS timing, a GNSS timing, a cellular network timing, and/or the like. In some aspects, the reference timing may be configured based at least in part on a combination of the receive timing and the internal timing (e.g., an average, a weighted average, a weighted combination, a maximum, a minimum, and/or the like).

Additionally, or alternatively, the client device 510 may configure the reference timing based at least in part on a maximum propagation delay associated with the client device 510 or the host device 505, a worst case difference between internal timings of the client device 510 and the host device 505, and/or the like. Additional details are described below in connection with FIGS. 6 and 7.

In some aspects, the discovery signal may indicate whether to use the receive timing, the internal timing, or a combination of the receive timing and the internal timing for the reference timing. In this case, the client device 510 may configure the reference timing using the indication in the discovery signal. Thus, in some aspects, the client device 510 may determine whether to use the receive timing, the internal timing, or a combination of the receive timing and the internal timing as the reference timing. For example, the client device 510 may select one of multiple options of timings to be used as the reference timing, where the multiple options include the receive timing, the internal timing, and a combination of the receive timing and the internal timing. In some aspects, the client device 510 may configure the reference timing based at least in part on selecting one of the timing options (e.g., the receive timing, the internal timing, the combination, and/or the like) to be used as the reference timing. In some aspects, the indication in the discovery signal may include an explicit indication that uses one or more bits dedicated to indicating the reference timing to be used.

In some aspects, the indication in the discovery signal may include an implicit indication that uses one or more bits that indicate a parameter associated with the discovery signal. The parameter may include, for example, a RACH preamble configuration to be used by the client device 510, a format of a RACH preamble to be used by the client device 510, a subcarrier spacing associated with the RACH preamble configuration, a timing accuracy associated with the host device 505, and/or the like. Additionally, or alternatively, the client device 510 may configure the reference timing based at least in part on a structure of the discovery signal, such as a TTI structure (e.g., a symbol structure, a slot structure, a subframe structure, a frame structure, and/or the like), a reference signal location within the discovery signal, and/or the like.

Additionally, or alternatively, the client device 510 may configure the reference timing based at least in part on information stored by the client device 510 in association with a previous communication with the host device 505. For example, the client device 510 may have previously established a connection with the host device 505 and may have determined a reference timing for communicating with the host device 505 (e.g., based at least in part on an indication of the reference timing by the host device 505). In some aspects, the client device 510 may store an indication of this reference timing (e.g., for a period of time), and may later use the reference timing for subsequent communications with the host device 505 (e.g., after the previous connection is terminated).

Additionally, or alternatively, the client device 510 may configure the reference timing based at least in part on an indication from a device other than the host device 505, such as a base station 110 and/or the like. For example, the host device 505 and/or the client device 510 may use an out-of-band connection (e.g., an indirect connection) to communicate reference timings, such as via one or more base stations 110 to which the host device 505 and/or the client device 510 are connected. Additionally, or alternatively, the client device 510 may use a default value stored in memory of the client device 510 (e.g., a pre-configured value, a value from a 3GPP specification, and/or the like) to configure the reference timing.

Additionally, or alternatively, the client device 510 may configure the reference timing based at least in part on one or more dynamic parameters associated with an environment in which the client device 510 and/or the host device 505 is operating. A dynamic parameter may include, for example, a speed with which the client device 510 and/or the host device 505 is moving, a direction in which the client device 510 and/or the host device 505 is moving, a distance between the client device 510 and the host device 505, an acceleration of the client device 510 and/or the host device 505, a topography of a location of the client device 510 and/or the host device 505, and/or the like. One or more of these dynamic parameters may impact a maximum propagation delay (e.g., associated with the client device 510 and/or the host device 505) and/or a worst case difference between internal timings of the client device 510 and the host device 505, which may impact whether selection of the receive timing from the host device 505, the internal timing of the client device 510, or a combination of the receive timing and the internal timing would improve performance, as described in more detail below in connection with FIGS. 6 and 7.

Additionally, or alternatively, the client device 510 may configure the reference timing based at least in part on a timing accuracy of the client device 510 and/or a timing accuracy of the host device 505. These timing accuracies may impact a worst case difference between internal timings of the client device 510 and the host device 505, which may impact whether selection of the receive timing from the host device 505, the internal timing of the client device 510, or a combination of the receive timing and the internal timing would improve performance, as described in more detail below in connection with FIGS. 6 and 7.

Additionally, or alternatively, the client device 510 may configure the reference timing based at least in part on a comparison of the internal timing and the receive timing. For example, the client device 510 may configure the reference timing based at least in part on the comparison and one or more threshold values.

Additionally, or alternatively, the client device 510 may configure the reference timing based at least in part on a communication schedule associated with the client device 510. For example, the client device 510 may select a reference timing that avoids interfering with one or more other communications scheduled for the client device 510.

Additionally, or alternatively, the client device 510 may configure the reference timing based at least in part on a frequency band used for communications between the client device 510 and the host device 505. For example, the internal timing may be selected for the reference timing when the client device 510 and the host device 505 communicate using a sub-6 GHz frequency band. As another example, the receive timing may be selected for the reference timing when the client device 510 and the host device 505 communicate using a millimeter wave frequency band.

As shown by reference number 530, the client device 510 may transmit the response to the discovery signal using the configured reference timing. The response may include, for example, a connection setup request, a RACH preamble, a RACH message (e.g., RACH MSG1 and/or the like), a query signal to obtain a discovery message, a response to a discovery preamble, a response to the discovery message, and/or the like. The client device 510 may transmit the response using, for example, a symbol timing, a slot timing, a subframe timing, a frame timing, and/or the like, that corresponds to the reference timing.

As shown by reference number 535, the host device 505 may monitor a set of resources for the response based at least in part on the reference timing (e.g., as determined by the host device 505 as described above in connection with reference number 515). In some aspects, the host device 505 may select a reference timing that requires monitoring of fewer resources as compared to another reference timing, thereby conserving processing resources, memory resources, battery power, and/or the like of the host device 505.

As indicated above, FIG. 5 is provided as an example. Other examples may differ from what is described with respect to FIG. 5.

Figure 6:
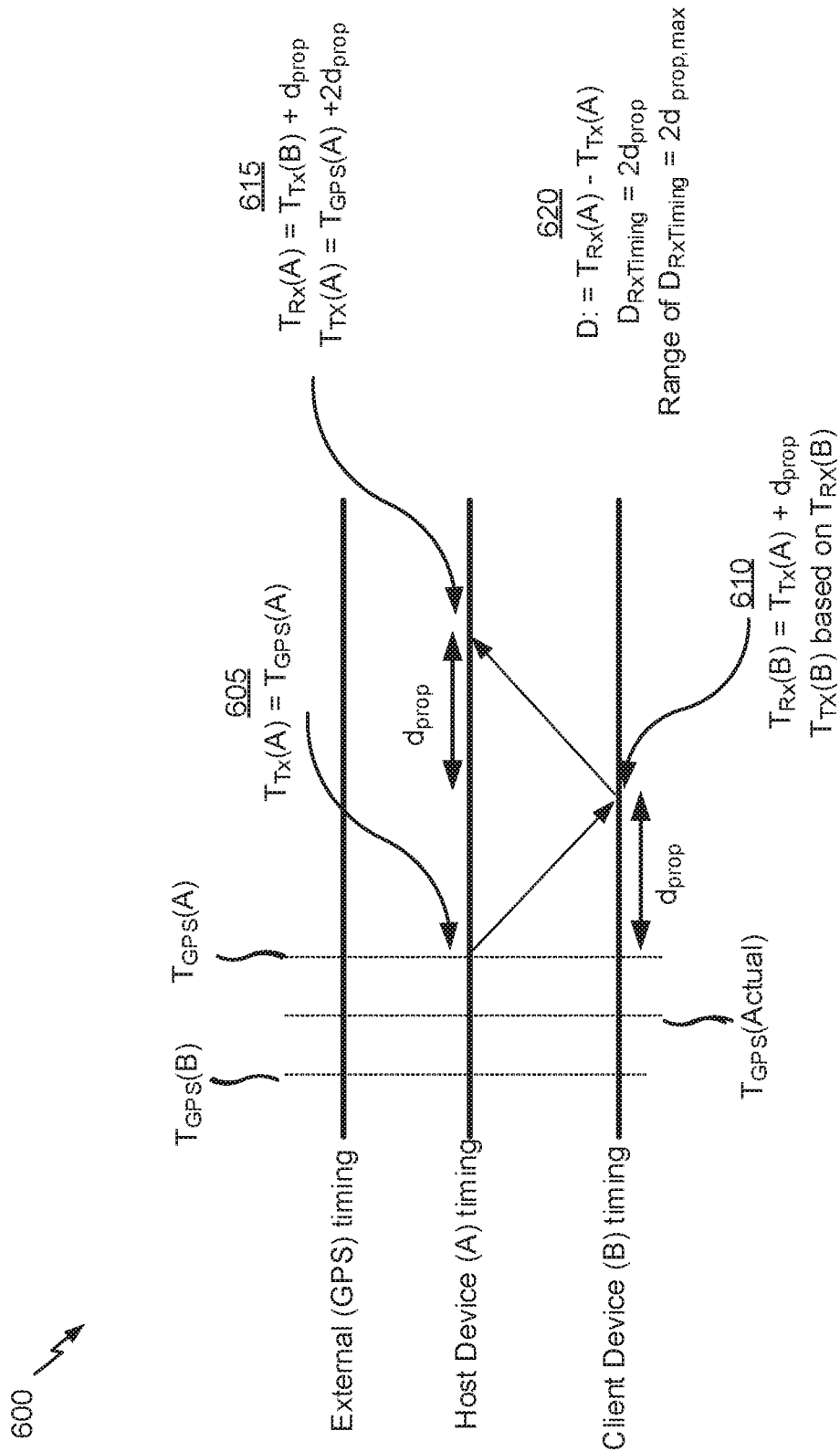
Figure 7:
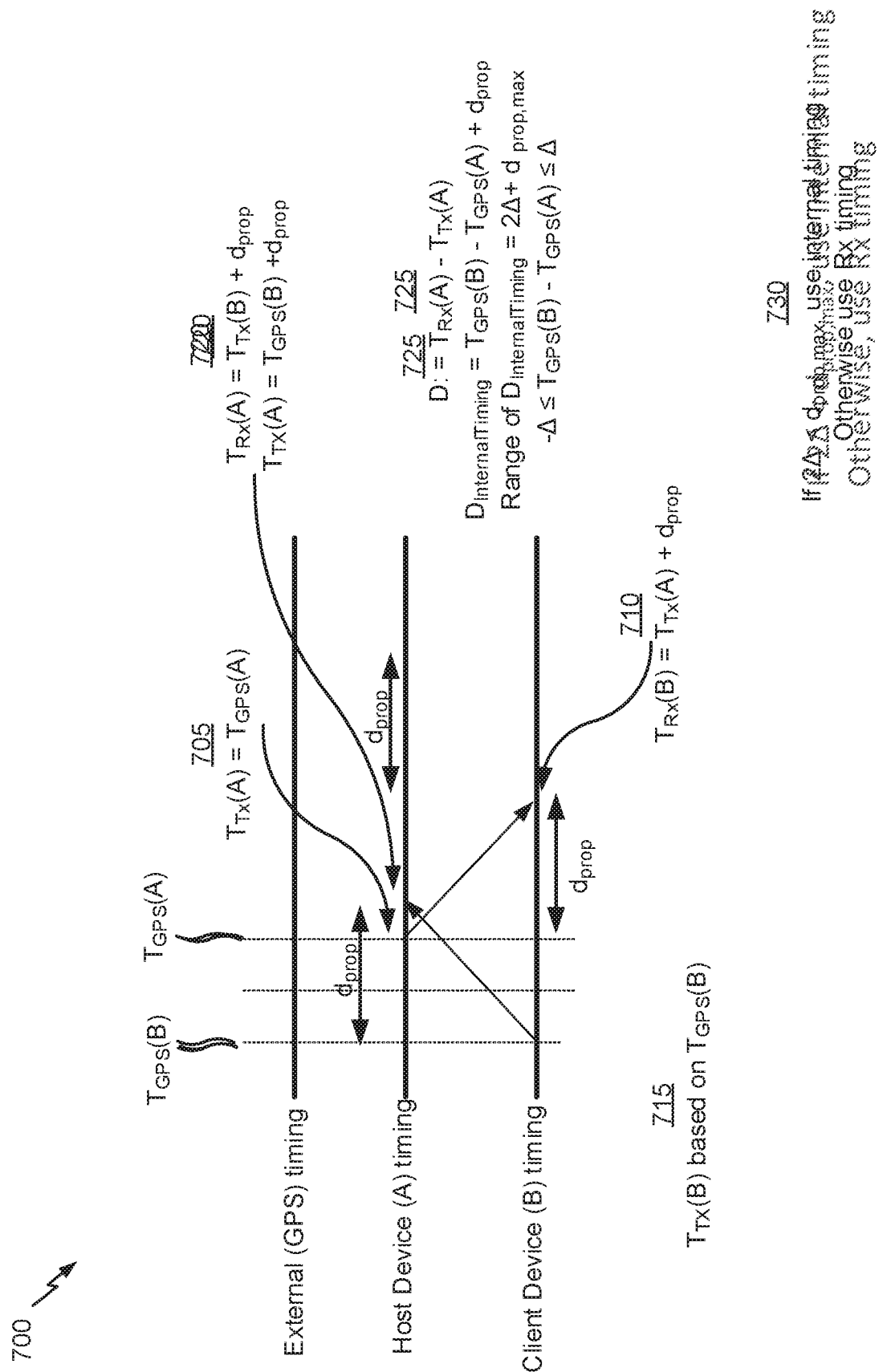

FIGS. 6 and 7 are diagrams illustrating examples 600 and 700 relating to determining a reference timing for a discovery procedure, in accordance with various aspects of the present disclosure.

As shown in FIG. 6, a host device (e.g., represented as "A") may use an inaccurate internal timing (shown as $T_{GPS}(A)$) when compared to an actual, accurate external timing, such as a GPS timing (shown as $T_{GPS}(Actual)$). Similarly, a client device (e.g., represented as "B") may use an inaccurate internal timing (shown as $T_{GPS}(B)$) when compared to the actual, accurate external timing.

As shown by reference number 605, the host device may use an internal timing to transmit a discovery signal to the client device. In this case, the transmission time, $T_{TX}(A)$, may be based at least in part on the internal timing of the host device, shown as $T_{GPS}(A)$.

As shown by reference number 610, the client device may receive the discovery signal at a time that is equal to the transmission time of the host device, $T_{TX}(A)$, plus a propagation delay $d_{prop}$ associated with over-the-air transmissions from the host device to the client device. In example 600, the client device uses a receive timing from the host device as a reference timing for transmission of a response to the discovery signal. Thus, in this case, a transmission time of the response, $T_{TX}(B)$, may be based at least in part on the receive timing, shown as $T_{RX}(B)$.

As shown by reference number 615, the host device may receive the response at a time that is equal to the transmission time of the client device, $T_{TX}(B)$, plus a propagation delay $d_{prop}$ associated with over-the-air transmissions from the client device to the host device. In example 600, since the transmission time of the client device depends on the transmission timing of the host device (e.g., $T_{GPS}(A)$) and the propagation delay, the reception time of the response by the host device, $T_{RX}(A)$, depends on the transmission timing of the host device plus twice the propagation delay.

As shown by reference number 620, when the receive timing is used as the reference timing, a timing offset, $D_{RxTiming}$, between the reception time of the response by the host device, $T_{RX}(A)$, and the transmission time of the discovery signal by the host device, $T_{TX}(A)$, may depend on twice the propagation delay (e.g., $2d_{prop}$). In this case, the range of the timing offset, $D_{RxTiming}$, may depend on twice the maximum propagation delay $2d_{prop,max}$.

As shown in FIG. 7, and by reference number 705, the host device may use an internal timing to transmit a discovery signal to the client device, in a similar manner as described above in connection with FIG. 6. In this case, the transmission time, $T_{TX}(A)$, may be based at least in part on the internal timing of the host device, shown as $T_{GPS}(A)$.

As shown by reference number 710, the client device may receive the discovery signal at a time that is equal to the transmission time of the host device, $T_{TX}(A)$, plus a propagation delay $d_{prop}$ associated with over-the-air transmissions from the host device to the client device, as described above in connection with FIG. 6.

As shown by reference number 715, in example 700, the client device uses an internal timing of the client device, $T_{GPS}(B)$, as a reference timing for transmission of a response to the discovery signal. Thus, in this case, a transmission time of the response, $T_{TX}(B)$, may be based at least in part on the internal timing, $T_{GPS}(B)$ (e.g., instead of the receive timing, $T_{RX}(B)$, as described above in connection with FIG. 6).

As shown by reference number 720, the host device may receive the response at a time that is equal to the transmission time of the client device, $T_{TX}(B)$, plus a propagation delay $d_{prop}$ associated with over-the-air transmissions from the client device to the host device. In example 700, since the transmission time of the client device depends on the internal timing of the client device (e.g., $T_{GPS}(B)$) and the propagation delay, the reception time of the response by the host device, $T_{RX}(A)$, depends on the internal timing of the client device plus the propagation delay.

As shown by reference number 725, when the internal timing of the client device is used as the reference timing, a timing offset, $D_{InternalTiming}$, between the reception time of the response by the host device, $T_{RX}(A)$, and the transmission time of the discovery signal by the host device, $T_{TX}(A)$, may depend on the propagation delay (e.g., $d_{prop}$) and a difference between internal timings of the client device and the host device (e.g., $T_{GPS}(B) - T_{GPS}(A)$). In this case, the range of the timing offset, $D_{InternalTiming}$, may depend on twice the worst case difference between the internal timings (e.g., shown as $2\Delta$) and the maximum propagation delay (e.g., $d_{prop,max}$).

As described above in connection with FIG. 4, a reference timing for a response to a discovery signal may be determined and/or configured to reduce a range of the timing offset. By reducing the range of the timing offset, the host device and/or the client device may reduce inter-symbol interference, may permit the use of a smaller cyclic prefix or smaller gaps (e.g., thereby reducing resource overhead), may permit the use of smaller cyclic shifts for different RACH preambles (e.g., thereby permitting a larger number of RACH preambles to be used to differentiate between client devices), and/or the like.

Thus, in some aspects, the host device may determine the reference timing (and/or the client device may configure the reference timing) based at least in part on a maximum propagation delay associated with the client device and/or the host device, a worst case difference between internal timings of the client device and the host device, and/or the like. For example, as shown by reference number 730, the reference timing may be determined and/or configured using the internal timing (or by assigning a greater weight to the internal timing than the receive timing) when twice the worst case difference between the internal timings is less than (or equal to) the maximum propagation delay, which may result in a smaller range for the timing offset in this scenario. Conversely, the reference timing may be determined and/or configured using the receive timing (and/or by assigning a higher weight to the receive timing than the internal timing) when the maximum propagation delay is less than (or equal to) twice the worst case difference between the internal timings, which may result in a smaller range for the timing offset in this scenario.

In some aspects, the worst case difference between the internal timings is determined based at least in part on a first worst case offset, from a global timing, of a first internal timing of the client device (e.g., $T_{GPS}(B)$) and a second worst case offset, from the global timing, of a second internal timing of the host device (e.g., $T_{GPS}(A)$). In some aspects, the global timing is a GPS timing, a GNSS timing, a cellular network timing, and/or the like.

In some aspects, the maximum propagation delay and/or the worst case difference between internal timings is determined or estimated using a default value stored in memory (e.g., of the client device and/or the host device), one or more dynamic parameters associated with at least one of the client device or the host device (e.g., as described above in connection with FIG. 5), information transmitted and/or received in the discovery signal, and/or the like.

By selecting a reference timing that reduces the range of the timing offset, the host device and/or the client device may reduce inter-symbol interference, may permit the use of a smaller cyclic prefix or smaller gaps (e.g., thereby reducing resource overhead), may permit the use of smaller cyclic shifts for different RACH preambles (e.g., thereby permitting a larger number of RACH preambles to be used to differentiate between client devices), and/or the like.

As indicated above, FIGS. 6 and 7 are provided as examples. Other examples may differ from what is described with respect to FIGS. 6 and 7.

Figure 8:
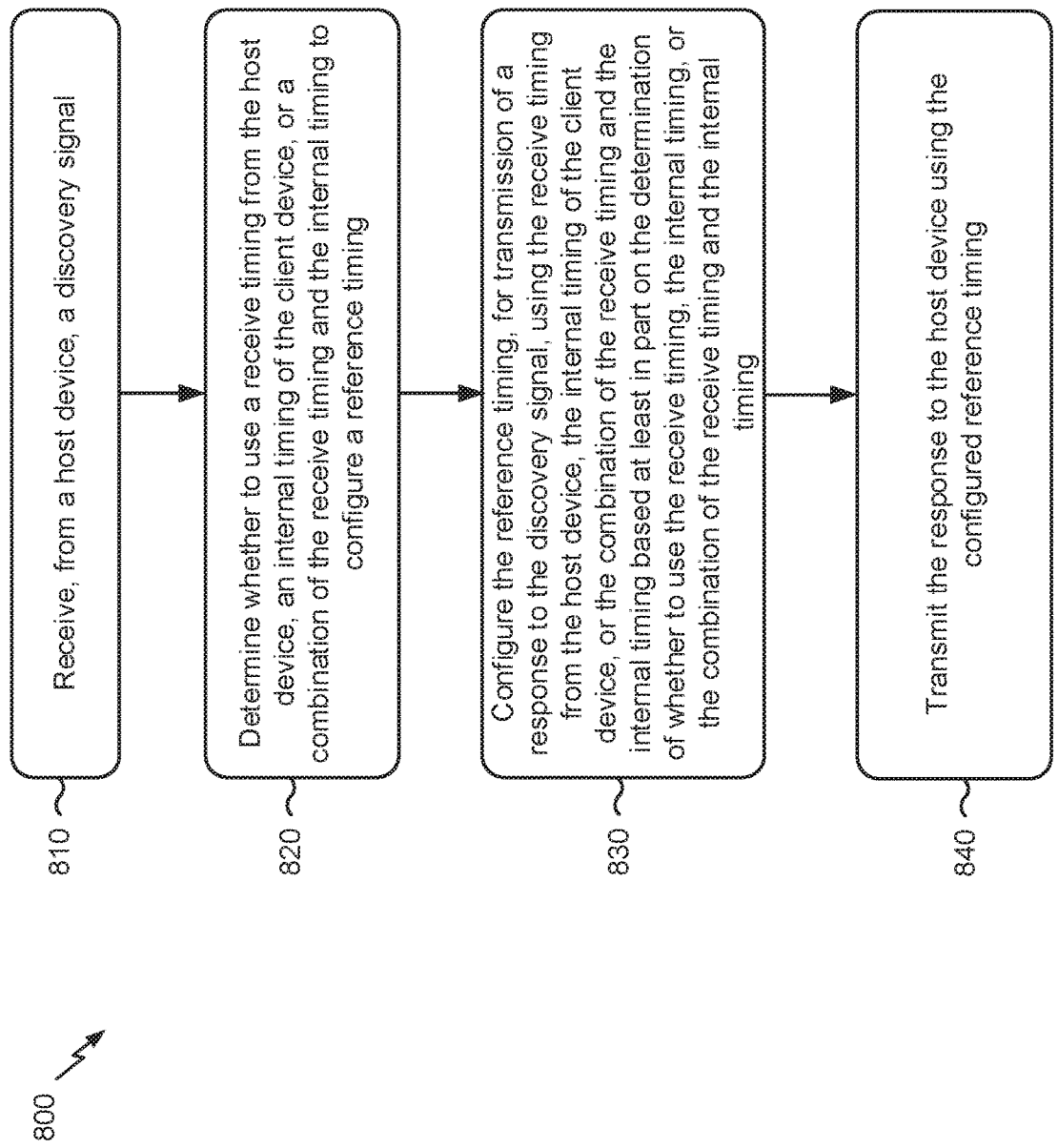
FIGS. 8 and 9 are diagrams illustrating example processes relating to determining a reference timing for a discovery procedure, in accordance with various aspects of the present disclosure.

FIG. 8 is a diagram illustrating an example process 800 performed, for example, by a client device, in accordance with various aspects of the present disclosure. Example process 800 is an example where a client device (e.g., UE 120, base station 110, and/or the like) performs operations associated with determining a reference timing for a discovery procedure.

As shown in FIG. 8, in some aspects, process 800 may include receiving, from a host device, a discovery signal (block 810). For example, the client device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive a discovery signal from a host device, as described above in connection with FIGS. 4-7.

As further shown in FIG. 8, in some aspects, process 800 may include determining whether to use a receive timing from the host device, an internal timing of the client device, or a combination of the receive timing and the internal timing to configure a reference timing (block 820). For example, the client device (e.g., using controller/processor 240, controller/processor 280, and/or the like) may determine whether to use a receive timing from the host device, an internal timing of the client device, or a combination of the receive timing and the internal timing to configure a reference timing, as described above in connection with FIGS. 4-7.

As further shown in FIG. 8, in some aspects, process 800 may include configuring the reference timing, for transmission of a response to the discovery signal, using the receive timing from the host device, the internal timing of the client device, or the combination of the receive timing and the internal timing based at least in part on the determination of whether to use the receive timing, the internal timing, or the combination of the receive timing and the internal timing (block 830). For example, the client device (e.g., using controller/processor 240, controller/processor 280, and/or the like) may configure a reference timing for transmission of a response to the discovery signal, as described above in connection with FIGS. 4-7. In some aspects, the reference timing may be configured using a receive timing from the host device, an internal timing of the client device, or a combination of the receive timing and the internal timing. Additionally, or alternatively, the reference timing may be configured based at least in part on the determination of whether to use the receive timing, the internal timing, or the combination of the receive timing and the internal timing.

As further shown in FIG. 8, in some aspects, process 800 may include transmitting the response to the host device using the configured reference timing (block 840). For example, the client device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit the response to the host device using the configured reference timing, as described above in connection with FIGS. 4-7.

Process 800 may include additional aspects, such as any single aspect or any combination of aspects described below and/or in connection with one or more other processes described herein.

In some aspects, the reference timing is configured based at least in part on at least one of a maximum propagation delay associated with at least one of the client device or the host device, a worst case difference between internal timings of the client device and the host device, or some combination thereof. In some aspects, the reference timing is configured using the receive timing when the maximum propagation delay is less than twice the worst case difference between the internal timings, or the reference timing is configured using the internal timing when twice the worst case difference between the internal timings is less than the maximum propagation delay. In some aspects, the worst case difference between the internal timings is determined based at least in part on a first worst case offset, from a global timing, of a first internal timing of the client device and a second worst case offset, from the global timing, of a second internal timing of the host device. In some aspects, the global timing comprises a global positioning system (GPS) timing or a global navigation satellite system timing. In some aspects, at least one of the maximum propagation delay or the worst case difference between internal timings is determined using at least one of: a default value stored in memory of the client device, one or more dynamic parameters associated with at least one of the client device or the host device, information received in the discovery signal, or some combination thereof.

In some aspects, the reference timing is configured based at least in part on an indication, in the discovery signal, of whether to use the receive timing, the internal timing, or the combination of the receive timing and the internal timing for the reference timing. In some aspects, the indication is an explicit indication using one or more bits dedicated to indicating the reference timing to be used. In some aspects, the indication is an implicit indication using one or more bits that indicate a parameter associated with the discovery signal. In some aspects, the parameter indicates at least one of: a random access channel (RACH) preamble configuration to be used by the client device, a format of a RACH preamble to be used by the client device, a subcarrier spacing associated with the RACH preamble configuration, a timing accuracy associated with the host device, or some combination thereof.

In some aspects, the reference timing is configured based at least in part on a structure of the discovery signal, wherein the structure comprises at least one of a transmission time interval structure or a reference signal location within the discovery signal. In some aspects, the reference timing is configured using at least one of: an indication received from a device other than the host device, a default value stored in memory of the client device, or some combination thereof.

In some aspects, the reference timing is configured based at least in part on information stored by the client device in association with a previous communication with the host device. In some aspects, the reference timing is configured based at least in part on one or more dynamic parameters associated with an environment in which the client device or the host device is operating. In some aspects, the one or more dynamic parameters include at least one of: a speed with which the client device or the host device is moving, a direction in which the client device or the host device is moving, a distance between the client device and the host device, an acceleration of the client device or the host device, a topography of a location of the client device or the host device, or some combination thereof.

In some aspects, the reference timing is configured based at least in part on at least one of: a timing accuracy of the client device, a timing accuracy of the host device, or some combination thereof. In some aspects, the reference timing is configured based at least in part on a comparison of the internal timing and the receive timing. In some aspects, the reference timing is configured based at least in part on the comparison and one or more threshold values.

In some aspects, the reference timing is configured based at least in part on a communication schedule associated with the client device. In some aspects, the reference timing is configured based at least in part on a frequency band for communications between the client device and the host device.

In some aspects, the response includes at least one of a connection setup request, a random access channel preamble, a random access channel message, a query signal to obtain a discovery message, a response to a discovery preamble, or a response to the discovery message. In some aspects, the internal timing is determined using an external source other than the host device. In some aspects, the internal timing comprises a global positioning system timing, global navigation satellite system, or a timing acquired via a cellular network. In some aspects, the receive timing comprises a timing associated with a time at which the discovery signal was received by the client device. In some aspects, the discovery signal is associated with a cellular vehicle to everything (CV2X) discovery procedure.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
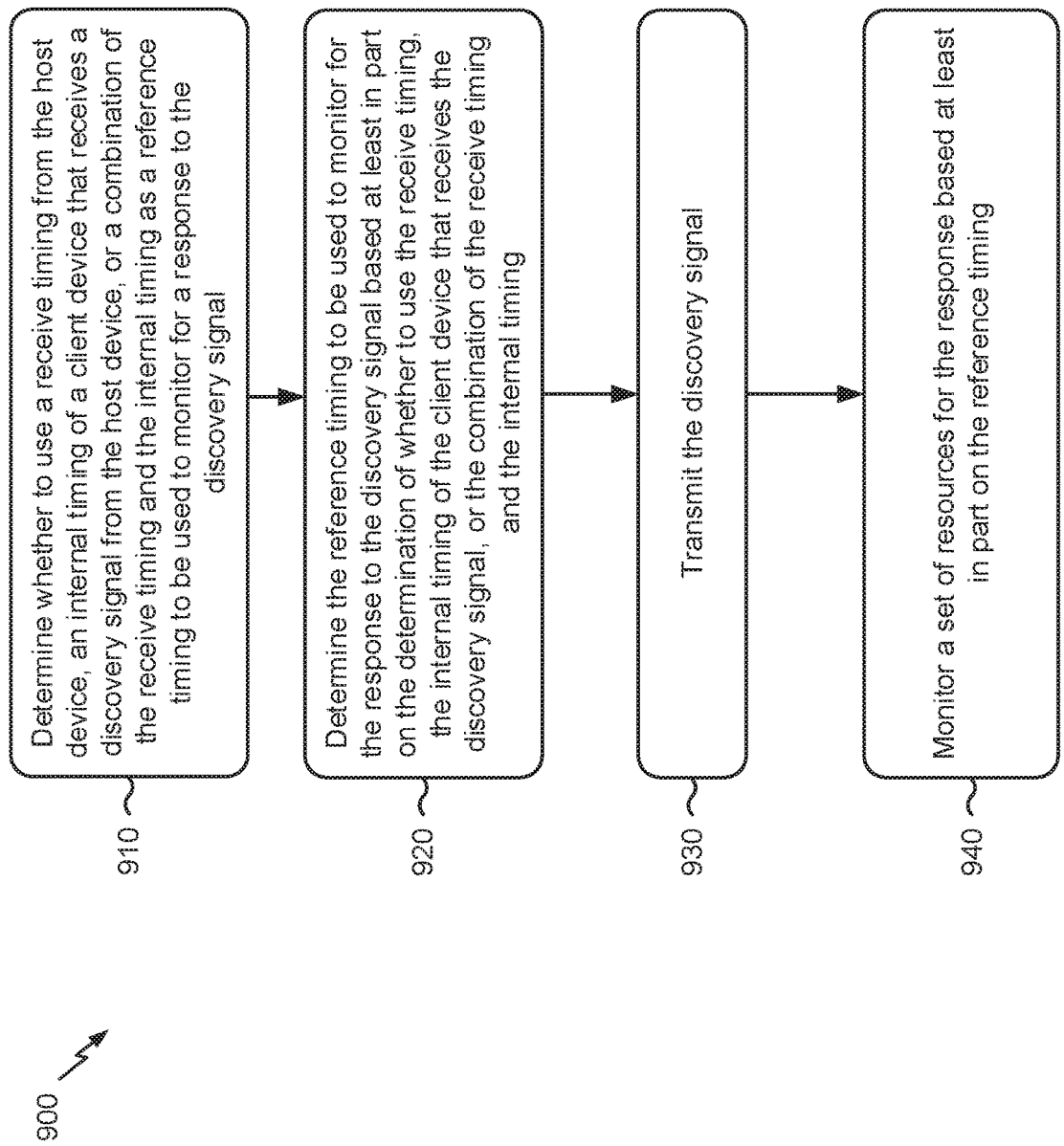

FIG. 9 is a diagram illustrating an example process 900 performed, for example, by a host device, in accordance with various aspects of the present disclosure. Example process 900 is an example where a host device (e.g., UE 120, base station 110, and/or the like) performs operations associated with determining a reference timing for a discovery procedure.

As shown in FIG. 9, in some aspects, process 900 may include determining whether to use a receive timing from the host device, an internal timing of a client device that receives a discovery signal from the host device, or a combination of the receive timing and the internal timing as a reference timing to be used to monitor for a response to the discovery signal (block 910). For example, the host device (e.g., using controller/processor 240, controller/processor 280, and/or the like) may determine whether to use a receive timing from the host device, an internal timing of a client device that receives a discovery signal from the host device, or a combination of the receive timing and the internal timing as a reference timing to be used to monitor for a response to the discovery signal, as described above in connection with FIGS. 4-7.

As further shown in FIG. 9, in some aspects, process 900 may include determining the reference timing to be used to monitor for the response to the discovery signal based at least in part on the determination of whether to use the receive timing, the internal timing of the client device that receives the discovery signal, or the combination of the receive timing and the internal timing (block 920). For example, the host device (e.g., using controller/processor 240, controller/processor 280, and/or the like) may determine a reference timing to be used to monitor for a response to a discovery signal, as described above in connection with FIGS. 4-7. In some aspects, the reference timing may be determined based at least in part on the determination of whether to use the receive timing, the internal timing of the client device that receives the discovery signal, or the combination of the receive timing and the internal timing.

As further shown in FIG. 9, in some aspects, process 900 may include transmitting the discovery signal (block 930). For example, the host device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit the discovery signal, as described above in connection with FIGS. 4-7.

As further shown in FIG. 9, in some aspects, process 900 may include monitoring a set of resources for the response based at least in part on the reference timing (block 940). For example, the host device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may monitor a set of resources for the response based at least in part on the reference timing, as described above in connection with FIGS. 4-7.

Process 900 may include additional aspects, such as any single aspect or any combination of aspects described below and/or in connection with one or more other processes described herein.

In some aspects, the reference timing is determined based at least in part on at least one of a maximum propagation delay associated with at least one of the client device or the host device, a worst case difference between internal timings of the client device and the host device, or some combination thereof. In some aspects, the reference timing is determined using the receive timing when the maximum propagation delay is less than twice the worst case difference between the internal timings, or the reference timing is determined using the internal timing when twice the worst case difference between the internal timings is less than the maximum propagation delay. In some aspects, the worst case difference between the internal timings is determined based at least in part on a first worst case offset, from a global timing, of a first internal timing of the client device and a second worst case offset, from the global timing, of a second internal timing of the host device. In some aspects, the global timing comprises a global positioning system (GPS) timing or a global navigation satellite system timing. In some aspects, at least one of the maximum propagation delay or the worst case difference between internal timings is determined using at least one of: a default value stored in memory of the host device, one or more dynamic parameters associated with at least one of the client device or the host device, or some combination thereof.

In some aspects, the reference timing is determined based at least in part on at least one of: a timing accuracy of the host device, a communication schedule associated with the host device, or some combination thereof. In some aspects, the reference timing is determined using at least one of: an indication received from another device, a default value stored in memory of the host device, or some combination thereof. In some aspects, the reference timing is determined based at least in part on a frequency band used by the host device.

In some aspects, the reference timing is determined based at least in part on one or more dynamic parameters associated with an environment in which the host device is operating. In some aspects, the one or more dynamic parameters include at least one of a speed with which the host device is moving, a direction in which the host device is moving, a distance between the host device and one or more client devices, an acceleration of the host device, a topography of a location of the host device, or some combination thereof.

In some aspects, the reference timing is indicated in the discovery signal. In some aspects, the reference timing is explicitly indicated in the discovery signal using one or more bits dedicated to indicating the reference timing. In some aspects, the reference timing is implicitly indicated in the discovery signal using one or more bits that indicate a parameter associated with the discovery signal. In some aspects, the parameter indicates at least one of: a random access channel (RACH) preamble configuration to be used by a client device, a format of a RACH preamble to be used by the client device, a subcarrier spacing associated with the RACH preamble configuration, a timing accuracy associated with the host device, or some combination thereof. In some aspects, the reference timing is indicated in the discovery signal based at least in part on structure of the discovery signal, wherein the structure comprises at least one of a transmission time interval structure or a reference signal location within the discovery signal.

In some aspects, the reference timing is indicated in association with a previous communication between the host device and a client device. In some aspects, the discovery signal indicates a random access channel (RACH) configuration, and the RACH configuration is determined based at least in part on the reference timing. In some aspects, the receive timing comprises a timing associated with when the discovery signal is received by the client device. In some aspects, the discovery signal is associated with a cellular vehicle to everything (CV2X) discovery procedure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a client device, comprising:
receiving, from a host device, a discovery signal;
determining whether to use a receive timing from the host device, an internal timing of the client device, or a combination of the receive timing and the internal timing to configure a reference timing based at least in part on a difference between internal timings of the client device and the host device;
configuring the reference timing, for transmission of a response to the discovery signal, using the receive timing, the internal timing, or the combination of the receive timing and the internal timing based at least in part on the determination of whether to use the receive timing, the internal timing, or the combination of the receive timing and the internal timing; and
transmitting the response to the host device using the configured reference timing.

2. The method of claim 1, wherein the reference timing is further configured based at least in part on:
a propagation delay associated with at least one of the client device or the host device.

3. The method of claim 2, wherein the reference timing is configured using the receive timing when the propagation delay is less than twice the difference between the internal timings, or
wherein the reference timing is configured using the internal timing when twice the difference between the internal timings is less than the propagation delay.

4. The method of claim 1, wherein the difference between the internal timings is determined based at least in part on a first offset, from a global timing, of the internal timing and a second offset, from the global timing, of an internal timing of the host device.

5. The method of claim 4, wherein the global timing comprises a global positioning system (GPS) timing or a global navigation satellite system timing.

6. The method of claim 2, wherein at least one of the propagation delay or the difference between the internal timings is determined using at least one of:
a default value stored in memory of the client device,
one or more dynamic parameters associated with at least one of the client device or the host device, or
information received in the discovery signal.

7. The method of claim 1, wherein the reference timing is further configured based at least in part on an indication in the discovery signal, of whether to use the receive timing, the internal timing, or the combination of the receive timing and the internal timing for the reference timing.

8. The method of claim 7, wherein the indication includes one of:
an explicit indication using one or more bits dedicated to indicating the reference timing to be used, or
an implicit indication using one or more bits that indicate a parameter associated with the discovery signal.

9. The method of claim 8, wherein the parameter indicates at least one of:
a random access channel (RACH) preamble configuration to be used by the client device,
a format of a RACH preamble to be used by the client device,
a subcarrier spacing associated with the RACH preamble configuration, or
a timing accuracy associated with the host device.

10. The method of claim 1, wherein the reference timing is further configured based at least in part on at least one of:
a structure of the discovery signal,
wherein the structure comprises at least one of a transmission time interval structure or a reference signal location within the discovery signal,
an indication received from a device other than the host device,
a default value stored in memory of the client device,
information stored by the client device in association with a previous communication with the host device,
one or more dynamic parameters associated with an environment in which the client device or the host device is operating,
a timing accuracy of the client device,
a timing accuracy of the host device,
a communication schedule associated with the client device, or
a frequency band used for communications between the client device and the host device.

11. The method of claim 10, wherein the one or more dynamic parameters include at least one of:
a speed with which the client device or the host device is moving,
a direction in which the client device or the host device is moving,
a distance between the client device and the host device,
an acceleration of the client device or the host device, or
a topography of a location of the client device or the host device.

12. The method of claim 1, wherein the receive timing comprises a timing associated with a time at which the discovery signal was received by the client device.

13. A method of wireless communication performed by a host device, comprising:
determining, based at least in part on a difference between internal timings of the host device and a client device that receives a discovery signal from the host device, whether to use a receive timing from the host device, an internal timing of the client device, or a combination of the receive timing and the internal timing as a reference timing to be used to monitor for a response to the discovery signal;
determining the reference timing to be used to monitor for the response to the discovery signal based at least in part on the determination of whether to use the receive timing, the internal timing, or the combination of the receive timing and the internal timing;
transmitting the discovery signal; and
monitoring a set of resources for the response based at least in part on the reference timing.

14. The method of claim 13, wherein the reference timing is further determined based at least in part on:
a propagation delay associated with at least one of the client device or the host device.

15. The method of claim 14, wherein the reference timing is determined using the receive timing when the propagation delay is less than twice the difference between the internal timings, or the reference timing is determined using the internal timing when twice the difference between the internal timings is less than the propagation delay.

16. The method of claim 13, wherein the difference between the internal timings is determined based at least in part on a first offset, from a global timing, of the internal timing and a second offset, from the global timing, of an internal timing of the host device.

17. The method of claim 14, wherein at least one of the propagation delay or the difference between the internal timings is determined using at least one of:
- a default value stored in memory of the host device, or
- one or more dynamic parameters associated with at least one of the client device or the host device.

18. The method of claim 13, wherein the reference timing is further determined based at least in part on at least one of:
- a timing accuracy of the host device,
- a communication schedule associated with the host device,
- an indication received from another device,
- a default value stored in memory of the host device,
- a frequency band used by the host device to communicate with the client device, or
- one or more dynamic parameters associated with an environment in which the host device is operating.

19. The method of claim 18, wherein the one or more dynamic parameters include at least one of:
- a speed with which the host device is moving,
- a direction in which the host device is moving,
- a distance between the host device and one or more client devices,
- an acceleration of the host device, or
- a topography of a location of the host device.

20. The method of claim 13, wherein the reference timing is:
- explicitly indicated in the discovery signal using one or more bits dedicated to indicating the reference timing,
- implicitly indicated in the discovery signal using one or more bits that indicate a parameter associated with the discovery signal, or
- indicated in the discovery signal based at least in part on a structure of the discovery signal,
    - wherein the structure comprises at least one of a transmission time interval structure or a reference signal location within the discovery signal.

21. The method of claim 20, wherein the parameter indicates at least one of:
- a random access channel (RACH) preamble configuration to be used by the client device,
- a format of a RACH preamble to be used by the client device,
- a subcarrier spacing associated with the RACH preamble configuration, or
- a timing accuracy associated with the host device.

22. The method of claim 13, wherein the reference timing is indicated in association with a previous communication between the host device and a client device.

23. The method of claim 13, wherein the discovery signal indicates a random access channel (RACH) configuration, and
wherein the RACH configuration is determined based at least in part on the reference timing.

24. The method of claim 13, wherein the receive timing comprises a timing associated with a time at which the discovery signal is received by the client device.

25. A client device for wireless communication, comprising:
memory; and
one or more processors coupled to the memory, the memory and the one or more processors configured to:
receive, from a host device, a discovery signal;
determine whether to use a receive timing from the host device, an internal timing of the client device, or a combination of the receive timing and the internal timing to configure a reference timing based at least in part on a difference between internal timings of the client device and the host device;
configure the reference timing, for transmission of a response to the discovery signal, using the receive timing, the internal timing, or the combination of the receive timing and the internal timing based at least in part on the determination of whether to use the receive timing, the internal timing, or the combination of the receive timing and the internal timing; and
transmit the response to the host device using the configured reference timing.

26. The client device of claim 25, wherein the reference timing is configured using the receive timing when a propagation delay, associated with at least one of the client device or the host device, is less than twice the difference between the internal timings, or
wherein the reference timing is configured using the internal timing when twice the difference between the internal timings is less than the propagation delay.

27. The client device of claim 25, wherein the difference between the internal timings is determined based at least in part on a first offset, from a global timing, of the internal timing and a second offset, from the global timing, of an internal timing of the host device.

28. A host device for wireless communication, comprising:
memory; and
one or more processors coupled to the memory, the memory and the one or more processors configured to:
determine, based at least in part on a difference between internal timings of the host device and a client device that receives a discovery signal from the host device, whether to use a receive timing from the host device, an internal timing of the client device, or a combination of the receive timing and the internal timing as a reference timing to be used to monitor for a response to the discovery signal;
determine the reference timing to be used to monitor for the response to the discovery signal based at least in part on the determination of whether to use the receive timing, the internal timing, or the combination of the receive timing and the internal timing;
transmit the discovery signal; and
monitor a set of resources for the response based at least in part on the reference timing.

29. The host device of claim 28, wherein the reference timing is determined using the receive timing when a propagation delay, associated with at least one of the client device or the host device, is less than twice the difference between the internal timings, or the reference timing is determined using the internal timing when twice the difference between the internal timings is less than the propagation delay.

30. The host device of claim 28, wherein the difference between the internal timings is determined based at least in part on a first offset, from a global timing, of the internal timing and a second offset, from the global timing, of an internal timing of the host device.

\* \* \* \* \*